(12) United States Patent
Bernier et al.

(10) Patent No.: US 6,280,216 B1
(45) Date of Patent: Aug. 28, 2001

(54) LUG ADAPTER ASSEMBLY HAVING REDUCED FORCE CLIPS

(75) Inventors: Richard E. Bernier, Mebane; Charles Piper, Burlington; Gilbert Soares, Mebane; Edgar Yee, Chapel Hill; John J. Struble, Jr., Mebane; Edward B. Bynum, Jr., Chapel Hill, all of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/437,765

(22) Filed: Nov. 9, 1999

(51) Int. Cl.⁷ .......................... H01R 13/64; H01R 11/22; H01R 13/11
(52) U.S. Cl. ............................................ 439/251; 439/857
(58) Field of Search .................... 439/251, 856, 439/857; 361/823

(56) References Cited

U.S. PATENT DOCUMENTS

| | | | |
|---|---|---|---|
| 1,965,181 | 7/1934 | Gerlach et al. | 439/116 |
| 3,478,299 | 11/1969 | Cinatl et al. | 439/251 |
| 3,778,748 | 12/1973 | Holman | 439/251 |
| 4,077,687 | 3/1978 | Farag | 439/251 |
| 5,510,960 | 4/1996 | Rosen | 361/823 |
| 5,997,347 | * 12/1999 | Robinson et al. | 439/517 |

* cited by examiner

Primary Examiner—Brian Sircus
Assistant Examiner—Chandrika Prasad
(74) Attorney, Agent, or Firm—Cantor Colburn LLP; Carl B. Horton (57) ABSTRACT

A draw out unit (10) mounts switching devices (12,14) within a switchgear unit and electrically connects the switching devices (12,14) to electrical bus bars (16). A cutout portion (30) in draw out unit (10) receives an insulative housing (32) for a lug adapter assembly (34). Lug adapter assembly (34) includes a plurality of clip assemblies (36) positioned within receptacles (38) formed on insulative housing (32). Each clip assembly (36) slidably accepts one bus bar (16), thereby providing an electrical connection to bus bars (16). Lug adapter assembly (34) also includes lugs (40), which are electrically connected to clip assemblies (36) via a conductive bar (42). Lugs (40) accept wires (44), which extend from lugs (46) in switching device (12). Lugs (40) are arranged to minimize bending of wires (44). Clip assemblies (36) each include a plurality of staggered clips (104, 106). Upon insertion of draw out unit (10) into the switchgear, each bus bar (16) is received by the contact arms (116, 118) of first clip (106), before being received by contact arms (116, 118) of the second clip (104).

17 Claims, 7 Drawing Sheets

LUG ADAPTER ASSEMBLY HAVING REDUCED FORCE CLIPS

BACKGROUND OF THE INVENTION

This invention relates generally to electrical distribution equipment, and more specifically to a lug adapter assembly having current carrying clips (stabs) for attaching cable conductors to electric busway systems.

The use of switchgears in electrical distribution systems is well known. The switchgear houses a plurality of draw out units, with each draw out unit housing one or more switching devices, such as motor controllers and circuit breakers, which are releasably interconnected to one or more busbars. Periodically, the draw out units are removed from the switchgear to allow for maintenance of the equipment. The switching devices within the draw out units make electrical contact with the busbars through a plurality of clip connectors which extend from the draw out unit. Each clip connector is electrically connected to an electrical conductor for connection to the switching devices of the switchgear.

Clip connectors of the prior art are generally mounted within an insulative housing that is affixed to a frame of the draw out unit. Each clip connector is typically constructed of an electrically conductive material formed into a "U" shape. The two free ends of the "U"-shaped clip form contact arms, which extend within the clip housing and are aligned for electrical connection with a specific busbar. As the draw out unit is inserted into the switchgear, the busbar slides between the two contact arms, and the contact arms frictionally engage the busbar. Typically, only one clip connector attaches to each bus bar.

The design of the contact clip requires each contact arm to have a surface area in contact with the bus bar to reduce resistance to current flow and thereby prevent inefficient thermal losses. In the U-shaped contact clips found in the prior art, a contact surface is formed along the entire width of each of the two contact arms. Ideally, these contact surfaces remain parallel to the bus bar when the bus bar is engaged between the two contact arms, thus allowing the full width of the contact arm to be in contact with the bus bar. However, inaccuracies during manufacturing and mishandling during installation can cause deformities the contact arms and their contact surfaces. Such deformities allow only a small portion of the contact arm to actually contact the bus bar, resulting in an increase in resistance to current flow.

The design of the contact clip also requires that the contact arms exert a minimum compressive force (force per unit of area in contact with the bus bar) onto the busbar. This force is required to overcome the electromagnetic force generated by current flow in the contact aims, which tends to part the arms from the bus bar. Problematically, the required minimum compressive force is proportional to the amount of force required to insert the contact clips onto the busbar. In other words, clips having a high compressive force are difficult to slide onto the busbar. As a result, it is necessary to use a racking mechanism in order to develop sufficient insertion force to install the draw out unit into the switchgear. The need for a racking mechanism increases the equipment cost for switchgear installation and maintenance. In addition, the need for a racking mechanism necessitates that clearance space be provided for the racking mechanism within the switchgear. The additional clearance space increases the size and cost of the switchgear itself.

BRIEF SUMMARY OF THE INVENTION

The above-identified drawbacks of the prior art are overcome or alleviated by a lug adapter assembly having reduced forced clips of the present invention.

In an exemplary embodiment, a staggered clip assembly for providing electrical connection to a bus bar includes two clips for slidably receiving an edge of the same bus bar. The first clip having a first contact arm arranged for contacting a first side of the bus bar, and a second contact arm arranged for contacting the opposite side of the bus bar. The second clip having a third contact arm arranged for contacting the first side of the bus bar and a fourth contact arm arranged for contacting the opposite side of the bus bar. The first and second contact arms extend further from the edge of the bus bar than the third and fourth contact arms, reducing the insertion force of the clip onto the bus bar and insuring a plurality of contact points between the clip assembly and the bus bar.

BRIEF DESCRIPTION OF THE DRAWINGS

Referring now to the drawings wherein like elements are numbered alike in the several Figures.

DETAILED DESCRIPTION OF THE INVENTION

Figure 1:
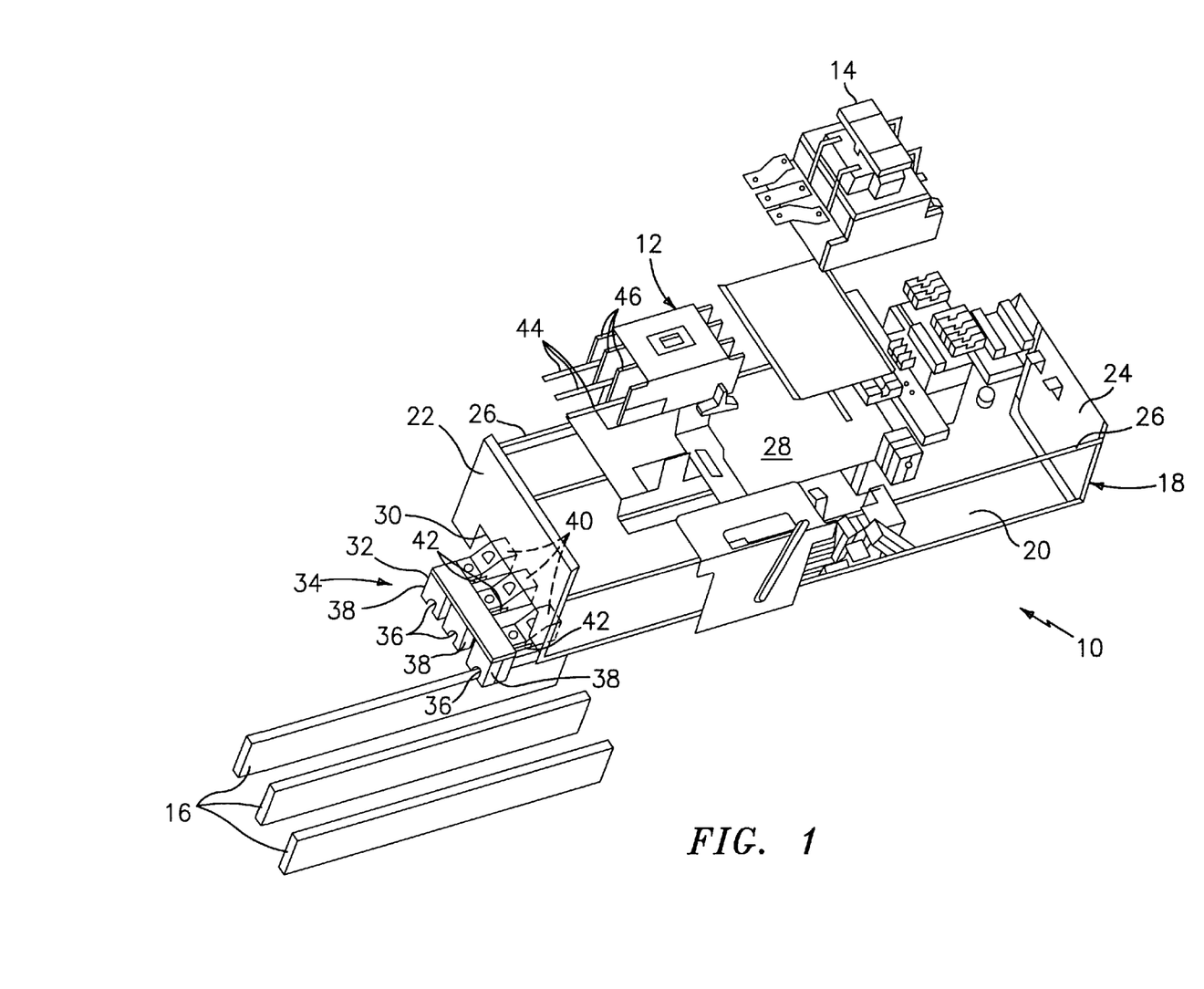
FIG. 1 is a partially exploded perspective view of a draw out unit with a lug adapter assembly of the present invention.

FIG. 1 is partially exploded view of a draw out unit 10 for mounting switching devices 12,14 within a switchgear unit (not shown) and electrically connecting the switching devices 12,14 to electrical bus bars 16. Switching devices 12,14 include, for example, a circuit breaker 12 and a starter unit 14. Draw out unit 10 includes a frame 18 having a bottom 20, two ends 22, 24, and side supports 26. Switching devices 12,14 are mounted to a support plate 28, which, in turn, is mounted to bottom 20. A cutout portion 30 on bottom 20 and side 22 receives an insulative housing 32 for a lug adapter assembly 34. Lug adapter assembly 34 includes a plurality of clip assemblies 36 positioned within receptacles 38 formed on insulative housing 32. Housing 32 is arranged within the draw out unit 10 so that clip assemblies 36 are aligned with vertical bus bars 16. Each clip assembly 36 slidably accepts one bus bar 16, thereby providing an electrical connection to bus bars 16. Lug adapter assembly 34 also includes lugs 40, which are electrically connected to clip assemblies 36 via a conductive bar 42. Lugs 46 extend upward within frame 18 when insulative housing 32 is installed in frame 18. Lugs 40 accept wires 44, which extend from lugs 46 in switching device 12. Clip assemblies 36, conductive bars 42, and lugs 40 are constructed from electrically conductive materials such as copper or aluminum to provide a current path from the bus bars 16 to wires 44 and, in turn, to the associated switching device 12.

Figure 2:
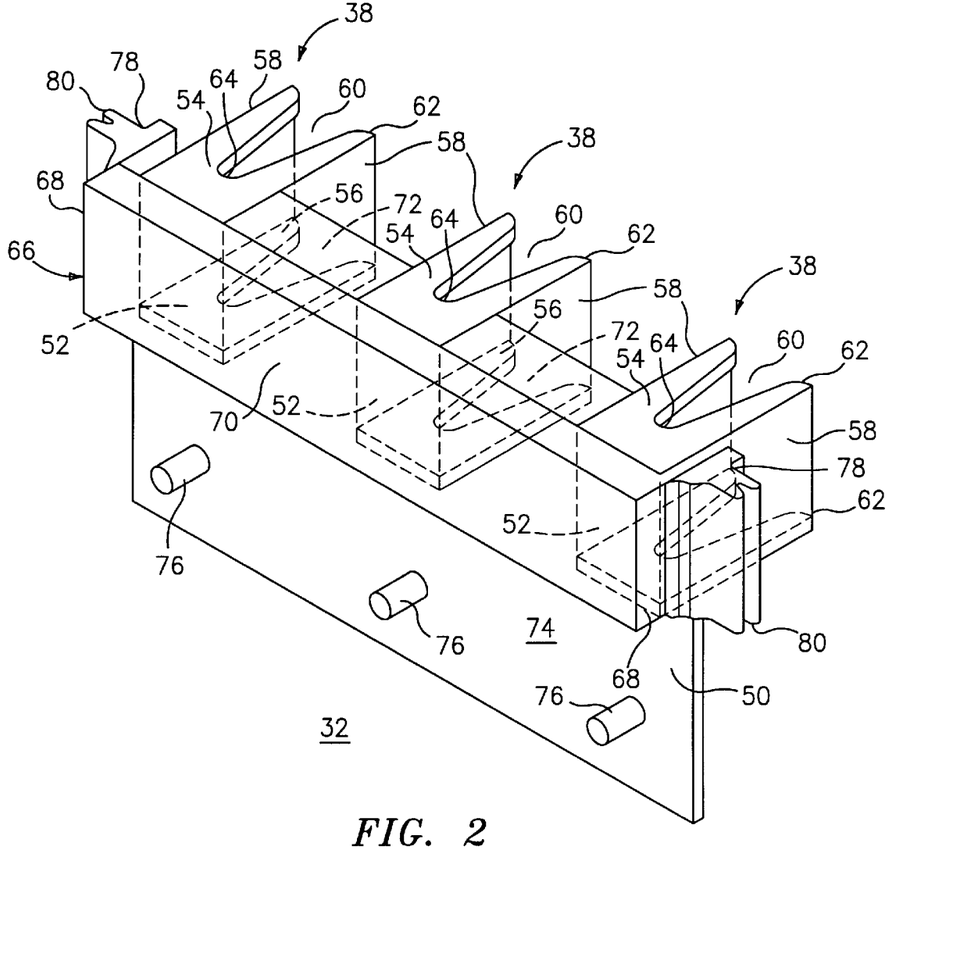
FIG. 2 is a perspective view of a housing for the lug adapter assembly of FIG. 1.

As best shown in FIG. 2, insulative housing 32 includes the plurality of receptacles 38, which extend substantially perpendicular from a top portion of a wall 50. In the embodiment shown, three receptacles 38 are used. However, it will be understood by one skilled in the art that housing 32 could include any number of receptacles 38, depending on the number of phases in the associated electrical distribution circuit. Wall 50 of housing 32 includes a substantially rectangular opening 52 at each receptacle 38. Each receptacle 38 is formed by an upper wall 54, a lower wall 56, and a pair of side walls 58, which frame rectangular openings 52. Each upper and lower wall 54, 56 includes a V-shaped cutout 60 therein. The cutout 60 extends from an edge 62 of walls 54,56 distal to wall 50, to an arcuate apex 64 located between wall 50 and front edge 62. Arcuate apex 64 is generally aligned with the clip assemblies 36 (see FIG. 3), allowing bus bars 16 to be received by clip assemblies 36.

A cover 66 extends from a side of wall 50 opposite receptacles 38. Cover 66 includes sides 68, which are attached to opposing side edges of wall 50 and extend perpendicular to wall 50. Cover 66 also includes a wall 70, which extends from side wall 68 to side wall 68. Wall 70 of cover 66 is substantially parallel to wall 50, forming a space between the two walls 50,70 for accepting conductive bar 42 (FIG. 1).

A pair of walls 72 extends from the wall 50 and between the receptacles 38 in the same plane as the upper wall 54 of the receptacles 38. Walls 72 are generally rectangular, and protrude no further than the arcuate apex 64. Walls 72 act as stiffening members to provide rigidity to housing 32.

The lower portion of wall 50 forms a detente surface 74, which contacts frame 18 of the draw out unit 10 (FIG. 1) when housing 32 is installed in the draw out unit 10. Located below the rectangular openings 52, three dowels 76 extend from the detente surface 74 in a direction opposite receptacles 38. When housing 32 is installed in the draw out unit 10, dowels 76 extend within holes in the frame 18 of the draw out unit 10 to secure housing 32 to the draw out unit 10. Extending outwardly from the sides of wall 50 and side walls 68 are a pair of mounting guides 78. Slots 80 within mounting guides 78 extend substantially parallel to wall 50 for slidably accepting a portion of the draw out unit frame 18, further securing housing 32 to the draw out unit 10.

Figure 3:
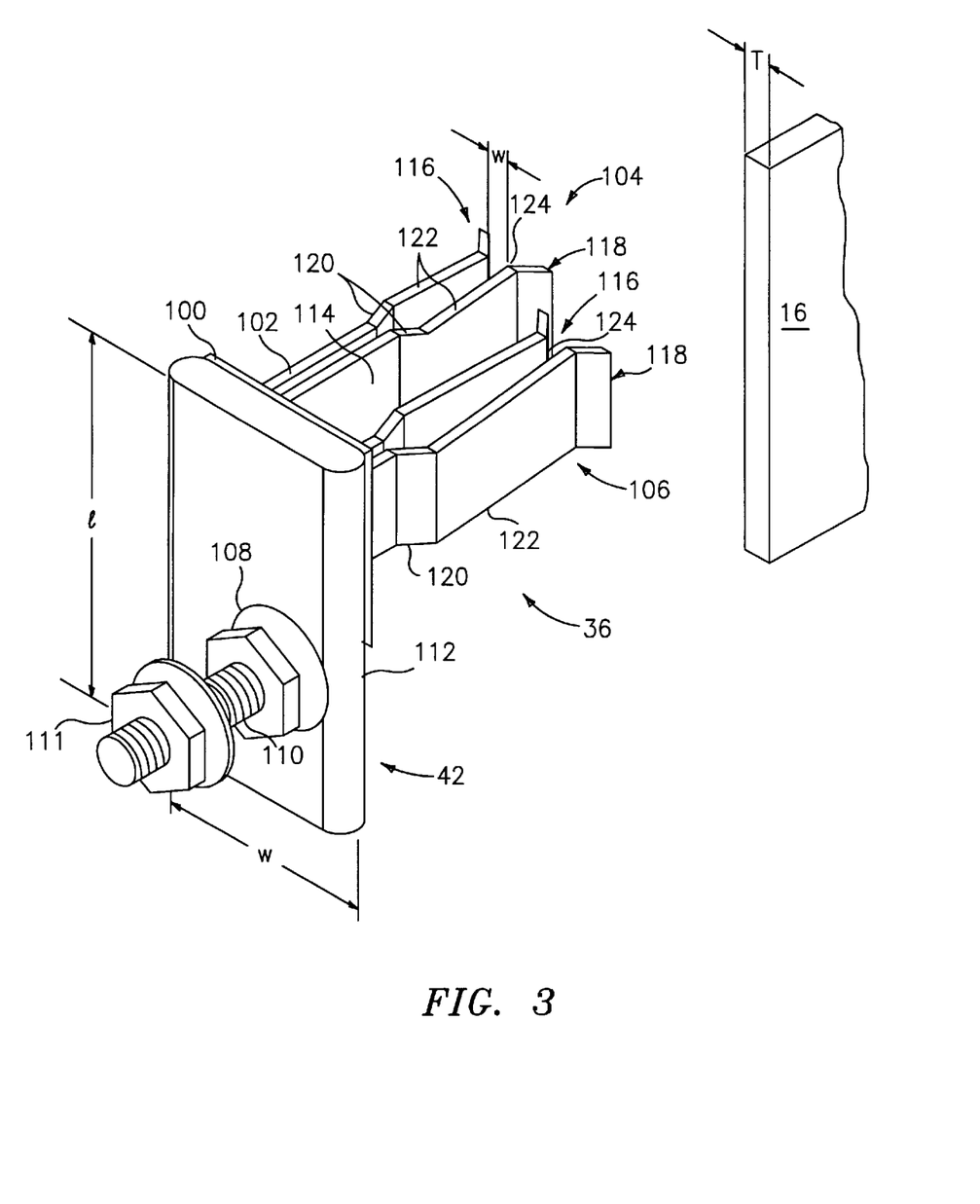
FIG. 3 is a perspective view of a clip assembly for the lug adapter assembly of FIG. 1.

Referring to FIG. 3, clip assembly 36 is shown attached to conductive bar 42. Clip assembly 36 includes a rectangular base 100 electrically connected to conductive bar 42, a root portion 102 extending perpendicularly from the base portion 100, and upper and lower clips 104, 106 extending from the root portion 102. The clip assembly 36 is mounted on the conductive bar 42 above a hole 108 passing through the conductive bar 42.

Conductive bar 42 is substantially rectangular in shape, having a length "l" greater than that of rectangular opening 52 of the housing 32 (FIG. 2) and a width "w" substantially equal to the width of the rectangular opening 52 (FIG. 2). The conductive bar 42 includes hole 108 disposed in a lower portion of conductive bar 42 for receiving a threaded bolt 110. Hole 108 is substantially square in shape for receiving a square portion on bolt 110 and thereby preventing bolt 110 from spinning within hole 108.

Rectangular base 100 is affixed to a rear surface 112 of an upper portion of the conductive bar 42. Rectangular base 100 has a width substantially equal to the width "w" of conductive bar 42 and a length substantially equal to half the length "l" of conductive bar 42.

The lower clip 106 is disposed below and extends further forward than the upper clip 104. Each clip 104,106 extends from root portion 102. The root portion 102 includes a horizontally disposed, narrow slot 114 that extends partially into the root portion 102 between the clips 104,106. Each clip 104,106 is constructed from two symmetric contact arms 116, 118. Each contact arm 116, 118 depends angularly away from the other to define a first portion 120 of each contact arm 116, 118. From the first portion 120 of contact arms 116, 118, each member depends angularly inward therefrom to define a second portion 122. Furthermore, the second portion 122 of lower clip 118 is longer than second portion 122 of upper clip 104, thereby resulting in the further extension of the lower clip 118. Each contact arm 116, 118 is turned-out, defining an oblique angle therebetween for guiding clips 104,106 onto the bus bars 16. A gap 124 is included between contact arms 116, 118 at each second portion 122. The width "W" of gap 124 is smaller than the thickness "T" of the edge of vertical bus bar 16 to be inserted within each clip 104,106 allowing clips 104,106 to frictionally engage bus bar 16 between contact arms 116, 118.

Referring to FIGS. 2 and 3, base 100, root portion 102, and clips 104,106 of each clip assembly 36 are formed from two pieces of electrically conductive material, which are secured together at the root portion 102 by welding or by a mechanical fastener as is well known in the art. When the clip assembly 36 is mounted within the housing 32, the root portion 102 passes through the rectangular opening 52, and the clips 104,106 are vertically aligned and extend horizontally from the root portion 102 within the receptacle 38.

Figure 4:
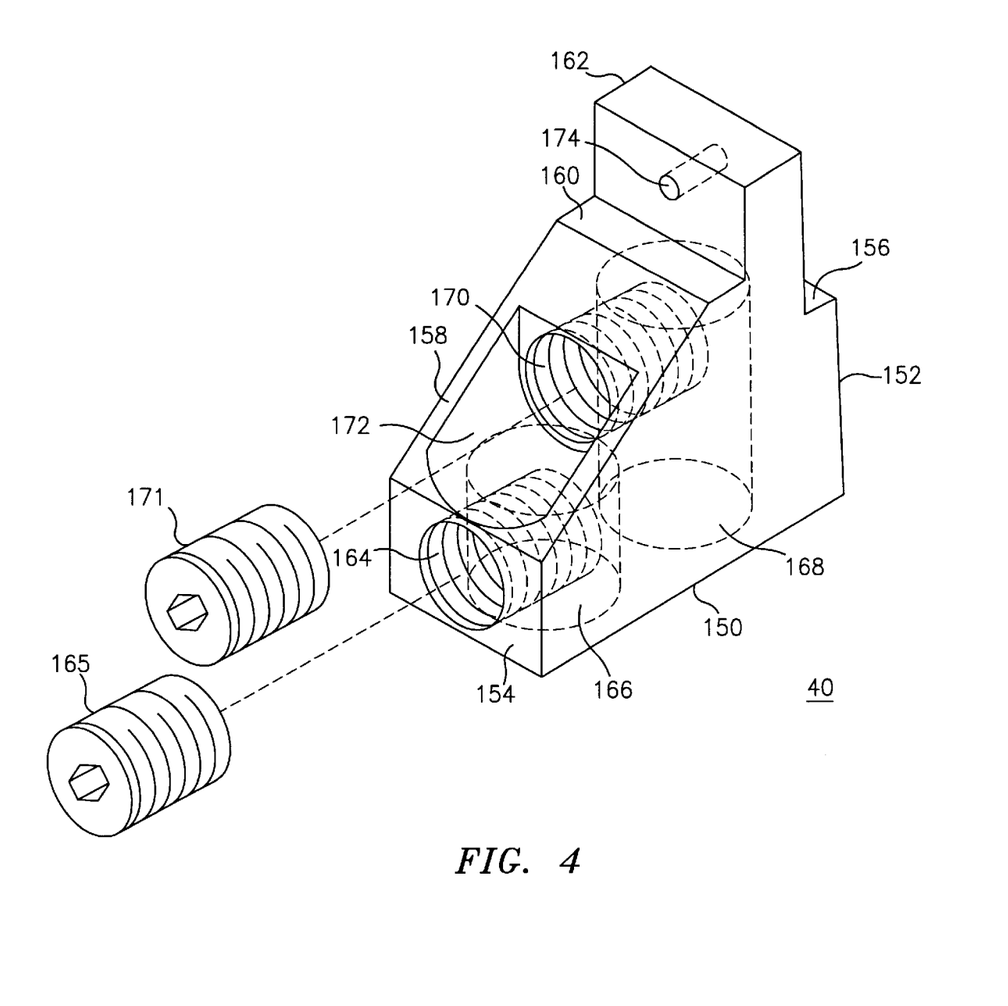
FIG. 4 is a perspective view of a lug for the lug adapter assembly of FIG. 1.

Referring to FIG. 4, an exemplary embodiment of the lug 40 of the present invention is shown. The lug 40 comprises a flat bottom surface 150 from which a rear surface 152 and an opposing front surface 154 perpendicularly depend. Front surface 154 is substantially rectangular. Rear surface 152 is planar and has a horizontal step (shoulder) 156 defining its end. The step 156 has a depth substantially equal to the thickness of the conductive bar 42. An inclined surface 158 depends in a rearward direction from the front surface 154. A horizontally disposed surface 160 extends rearward from the inclined surface 158. A rectangular tab 162 extends upwardly between the horizontally disposed surface 160 and the horizontal step 156.

A first threaded hole 164 is positioned horizontally passing into the front surface 154 and further extending into a first through hole 166. The first through hole 166 extends from the bottom surface 150 partially through the lug 40 and is disposed approximate the front surface 154. The axes of the first threaded hole 164 and the first through hole 166 form a substantially perpendicular intersection. A set screw 165 is installed in first threaded hole 164 for securing an electrical wire in first through hole 166.

A second through hole 168 extends from the bottom surface 150 and extends partially through the lug 40. The axis of the second through hole 168 is disposed parallel to the first through hole 166 and further aligned with a plane defined by the axes of the first through hole 166 and the threaded hole 164. A second threaded hole 170 is disposed above and parallel to the first threaded hole 164 having its axis on the plane formed by the axes of the holes 164, 166 and 168. The second threaded hole 170 extends through the second through hole 150. A set screw 171 is installed in second threaded hole 170 for securing an electrical wire in second through hole 168.

Inclined surface 158 includes a cutout 172 extending vertically into the inclined surface 158. The cutout 172 passes partially into the inclined surface 158 wherein the cutout 172 intersects the second threaded hole 170. The tab 162 includes a hole 174 for receiving the retaining bolt 110 (FIG. 3).

Figure 5:
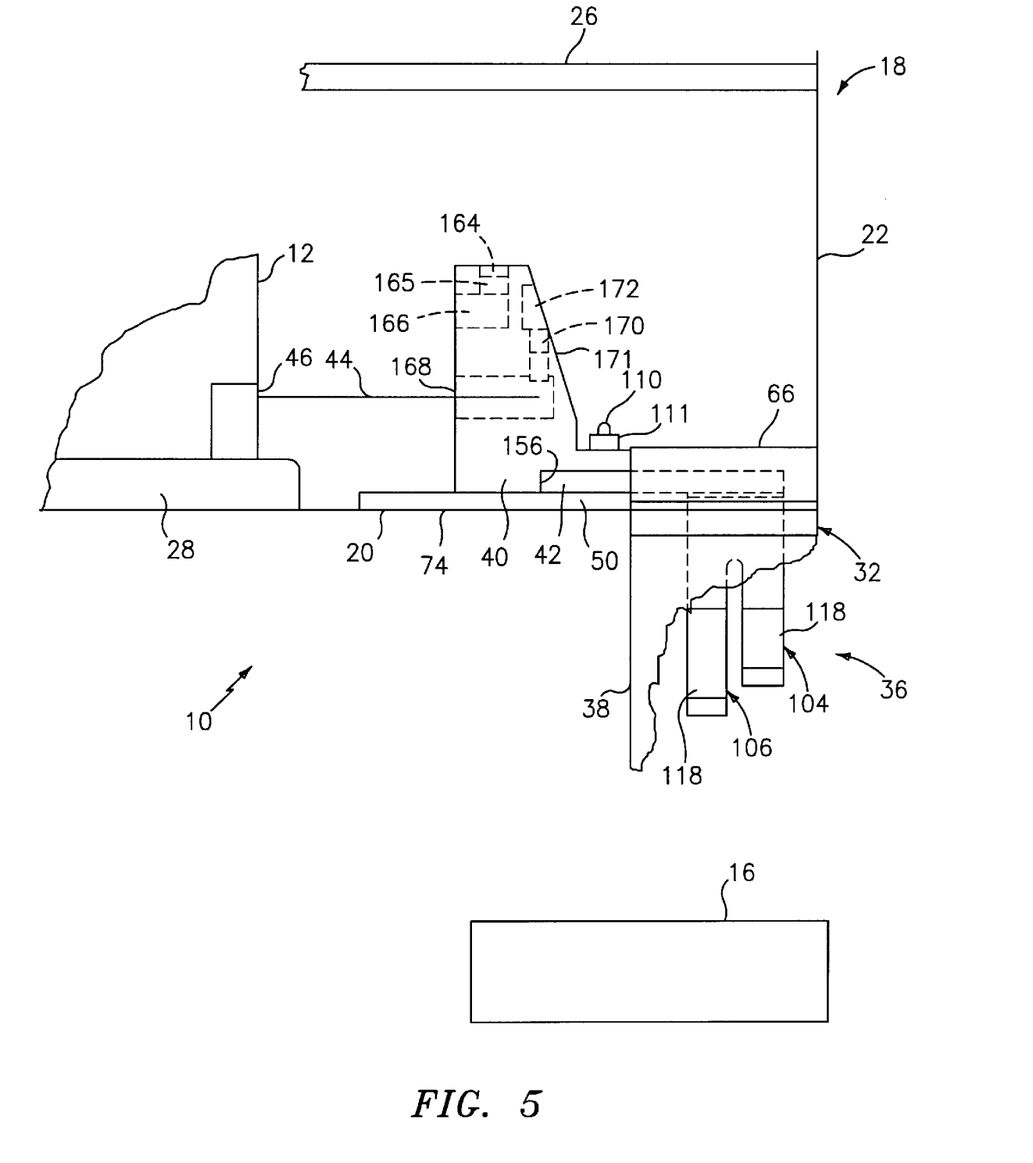
FIG. 5 is a side elevational partial cutaway view of an assembled lug adapter assembly within the draw out unit of FIG. 1.

As best shown in FIG. 5, the lug 40 is bolted to the conductive bar 42. Ends of cable 44 are inserted into hole 168 and retained therein by set screw 171. Another cable (not shown) may be secured in hole 166 in a similar manner. Lug 40 is retained at wall 50 by mounting the lug 40 on the threaded bolt 110 and retaining the lug 40 with the nut 111 thereon. Mounting the lug 40 on the conductive bar 42 of the lug assembly 34 provides a current path from the bus bars 16 to the cable 44. Step 156 on lug 40 abuts an end of conductive bar 42 for aligning lug 40 with conductive bar 42.

The conductive bar 42 is positioned flush with wall 50 and clips 104,106 extend perpendicular to wall 50 and within receptacle 38. Each clip 104,106 is centered within the receptacle 38, thereby being aligned with a vertical bus bar 16. Top cover 66 of insulative housing 32 resists forces developed by insertion and removal of the clips 104,106 onto the bus bar 16.

Within each lug 40, the hole 168 for accepting wire 44 has an axis that extends in a direction towards its corresponding switching device lug 46. This arrangement allows wire 44 to extend in a substantially linear fashion between lug 40 and lug 46, with no severe bending of wire 44. Because, there is no need to accommodate the bending radius of wire 44, the distance between switching device 12 and lug 40 can be made smaller than if bending of wire 44 was required. Decreased distance between switching device 12 and lugs 40 allows frame 18 to have smaller dimensions, thus making a more efficient use of space within the draw out unit 10 and rendering the draw out unit 10 more manageable.

Referring to FIGS. 2, 3, and 5, upon insertion of the draw out unit 10 into the switchgear (not shown), bus bars 16 enter into the V-shaped cutout 60 in housing 32 and into the gap 124 formed between contact arms 116,118 of lower clip 106. The bus bar 16 expands contact arms 116, 118 of the lower clip 106 before commencing entry and expansion of the contact arms 116, 118 of the upper clip 104. The insertion will continue until the detent surface 74 contacts a stop bar (not shown) of the switchgear—i.e. when insertion is complete and the bus bar 16 is fully inserted within the clip assembly 36. Staggering the clips 104,106 reduces the insertion force needed to expand the contact arms 116,118 by reducing the size and engagement area of each contact arm 116,118. Indeed, an insertion force of about 40 percent of the insertion force of a typical clip assembly is required because the clips are staggered. In addition, the use of more than one clip within each clip assembly helps to insure that each clip assembly will have more than one contact point on the bus bar.

Figure 6:
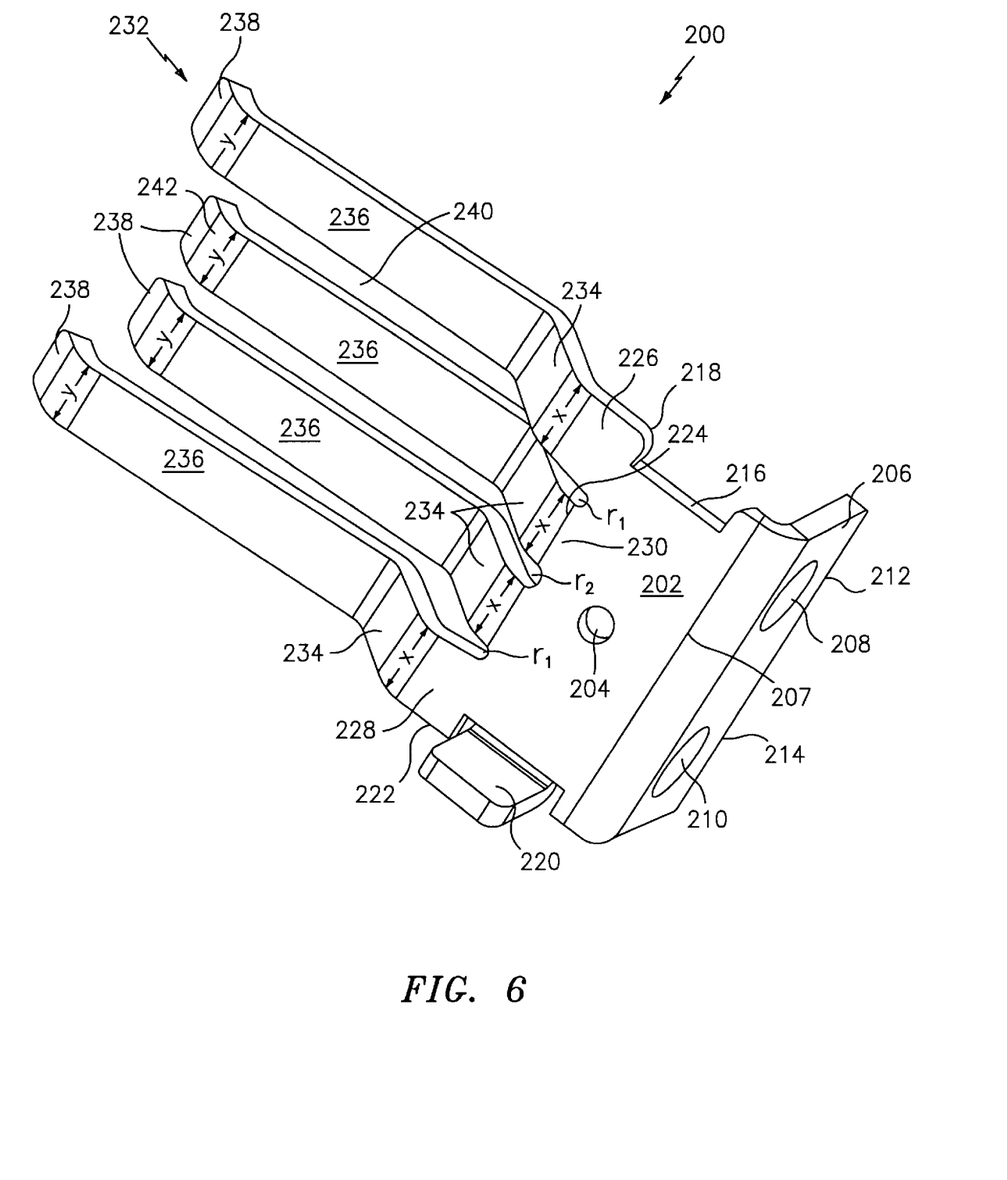
FIG. 6 is a perspective view of one side of an alternate embodiment of the clip assembly.
Figure 7:
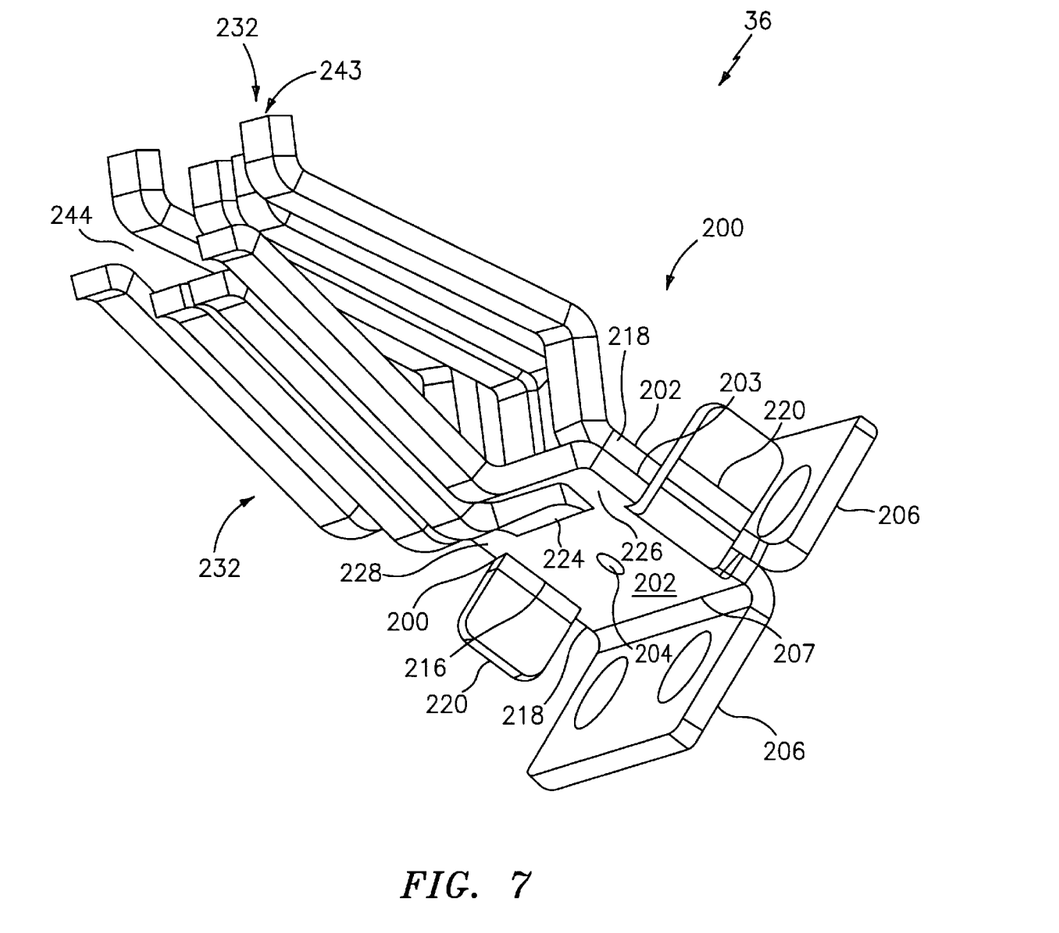
FIG. 7 is a perspective view of the alternate embodiment of the clip assembly.

Referring now to FIGS. 6 and 7, another embodiment of clip assembly 36 having four clips 243 is illustrated. FIG. 6 shows a first side 200 of clip assembly 36 having four contact arms. The side shown can be combined with a symmetrical second side 200 to produce the clip assembly 36 (see FIG. 7). Side 200 has an approximately rectangular root portion 202. The rectangular root portion 202 defines a circular aperture 204, which is preferably disposed in the center of the rectangular root portion 202. A base portion 206 depends perpendicularly from a first long edge 207 of the rectangular root portion 202. The base portion 206 is preferably the same thickness and length as the rectangular root portion 202. The base portion 206 defines two circular apertures 208, 210, which are preferably disposed approximately centrally within the top half 212 and the bottom half 214 of the base portion 206. The rectangular root portion 202 has a notch 216 disposed on a first short edge 218 of the rectangular root portion 202. A rectangular tab 220 depends perpendicularly forward along a second short edge 222 of the rectangular root portion 202. The tab 220 extends far enough from the rectangular root portion 202 to enable bending of the tab 220 over the second side 200 of the clip assembly 36 (see FIG. 7). The notch 216 is wide enough and deep enough to accept the width and the thickness of the tab 220 on the second side 200 of clip assembly 36.

A second long edge 224 of the rectangular root portion 202 has an upper protrusion 226 and a lower protrusion 228, with a recessed portion 230 disposed therebetween. Four contact arms 232 depend from the second long edge 224 of the rectangular root portion 202. Each contact arm 232 comprises a first portion 234 disposed against the second long edge 224 and depending angularly backwards from a plane formed by the root portion. From the first portion 234, each contact arm 232 depends angularly forward therefrom to define a second portion 236, which terminates with a turned-out portion 238 that angles backward. Turned-out portions 238 define oblique angles that guide the clip assembly 250 onto the bus bar 16. Each contact arm 232 is trapezoidal in shape, with the width "x" of the first portion 234 along the second long edge 224 being greater than the width "y" of the free end at the turned-out portion 238. If a width "x" at the ends of the contact arms 232 were the same or less than the width "y", then the contact arms 232 would be more likely to bend at and with respect to the root portion 202 than if the width "x" is greater than the width "y". Thus, the trapezoidal-shape of the contact arms 232 prevent rotation of the contact arms 232 with respect to the root portion 202.

The contact arms 232 depend from the second long edge 224: one contact arm 232 from the upper protrusion 226, one contact arm 232 from the lower protrusion 228, and two contact arms 232 from the recessed portion 230. The contact arms define three narrow slots 240, which extend from the turned-out portions 238 to radii formed on second long edge 224. The radius r2 formed between the middle two contact arms 232 is greater than the radii r1 formed between contact arms 232 and upper and lower protrusions 226, 228. The different radii allow the material stress all contact arms 232 to be approximately equal when bus bar 16 is slidably engaged by the clip assembly 36. That is, as shown in FIGS. 6–7, the clip assembly 36 includes four clips, each clip including a pair of contact arms arranged for contacting opposite sides of the bus bar 16. The clip assembly 36 may further comprise two sections of electrically conductive material as shown in FIG. 7. Thus, a first clip which includes first and second contact arms would comprise a first contact arm on one piece of electrically conductive material and a second contact arm on the other piece of electrically conductive material. A second clip would include third and fourth contact arms which would comprise a third contact arm on one piece of electrically conductive material and a fourth contact arm on the other piece of electrically conductive material. A third clip would include fifth and sixth contact arms which would comprises a fifth contact arm on one piece of electrically conductive material and a sixth contact arm on the other piece of electrically conductive material. A fourth clip would include seventh and eighth contact arms which would comprise a seventh contact arm on one piece of electrically conductive material and an eighth contact arm on the other piece of electrically conductive material. Thus, one piece of electrically conductive material, such as shown in FIG. 6, would include the first, third, fifth, and seventh contact arms and the other piece of electrically conductive material would include the second, fourth, sixth, and eighth contact arms. The radii r1 may thus be seen between the first and third contact arms and the fifth and seventh contact arms and the radius r2 is shown between the third and fifth contact arms. In other words, the design of radii $r_1$ and $r_2$ is such that the material stress in similar portions of each contact arm 232 will be approximately equal. It will be appreciated that the attachment of two of the contact arms 232 to the recessed portion 230, and two of the contact arms to the upper and lower protrusions 226, 228 causes the contact arms 232 attached to the upper and lower protrusions 226, 228 to extend outward from the rectangular root portion 202 further than the contact arms 232 that are attached to the recessed portion 230.

Turning now to FIG. 7, assembly of the clip assembly 36 is done by first fitting together the two sides 200 in such a way so that the rectangular root portions 202 are placed proximate each other, with the circular apertures 204 aligned, and with base portions 206 lying in the same plane and extending in opposite directions. The tang 220 of each side 200 is disposed against the first short edge 218 and within the notch 216 of the other side 200, and the long edges 207, 224 of each side 200 are disposed adjacent to the same long edges 207, 224 of the other side 200.

It will be appreciated that this fitting together of two sides 200 will align opposing contact arms 232 in symmetrical pairs that define four individual clips 243, which in turn define four gaps 244. Additionally, the individual rectangular root portions 202 of the two sides 200 will together form a single clip assembly root 203. As in the previous embodiment, the gap 244 will be narrower than the width of the bus bar 16. The individual clips 243 that depend from either of the protrusions 226, 228 will extend from the clip assembly root 203 a greater distance than the clips 243 that depend from the recessed portion.

To facilitate the proper and secure joining of the two sides 200, a rivet or similar fastening device (not shown) may be inserted through the circular apertures 204 disposed in the rectangular root portions 202. The use of a fastener will facilitate the proper alignment of the two sides 200, and will supplement the effectiveness of the rectangular tangs 220. To complete the assembly, tang 220 on one side 200 is bent over the rectangular root portion 202 of the other side 200 so that a portion of the tang 220 is disposed in a parallel plane to, and in intimate contact with, the rectangular root portion 202 of the other side 200. The same process is then performed on the other tang 220.

The clip assembly 250 of this embodiment can be attached to a conductive bar 42 (see FIGS. 1,3, and 5) by four bolts and four nuts or other connecting devices (not shown) that pass through the circular apertures 208, 210 in the base portion 206 of each side 200 of the clip assembly 36. The conductive bar 42 in this embodiment has holes (not shown) that align with the circular apertures 208, 210 in the clip assembly 36. The clip assembly 36 can also be fastened to the conductive bar 42 by spot welding, or any other means well known in the art, as in the first embodiment. The clip assembly 36 of this embodiment can be used in the lug adapter assembly 34 described above, and in any manner consistent therewith.

Upon installation of this embodiment of the present invention on a bus bar 16, the two protruding clips 3 will engage the bus bar 22 before the two recessed clips 243. As in the first embodiment, the force required to properly mount the clip assemblies 36 on the bus bar 16 is thereby significantly reduced.

The invention provides the advantage of requiring less force for insertion of the clips onto the bus bars, thus allowing a switching device to be inserted by hand while dispensing with the need for complex racking mechanisms. The invention further requires less space for housing the switching device because there is no racking mechanism. Furthermore, the lug of the present device provides for attachment of electric cable to the switching device without the need for large bend radii, allowing the size of the draw out unit to be reduced.

While preferred embodiments have been shown and described, various modifications and substitutions may be made thereto without departing from the spirit and scope of the present invention. Accordingly, it is to be understood that the present invention has been described by way of illustrations and not limitation.

What is claimed is:

1. A staggered clip assembly for providing electrical connection to a bus bar, the staggered clip assembly comprising:

a first clip for slidably receiving an edge of the bus bar, the first clip including a first contact arm arranged for contacting a first side of the bus bar, and a second contact arm arranged for contacting a second side of the bus bar opposite said first side, said first and second contact arms extending a first distance from said edge;

a second clip for slidably receiving said edge of the bus bar, the second clip including a third contact arm arranged for contacting said first side of the bus bar, and a fourth contact arm arranged for contacting said second side of the bus bar opposite said first side, said third and fourth contact arms extending a second distance from said edge, said second distance being less than said first distance;

a third clip for slidably receiving said edge of the bus bar, the third clip including a fifth contact arm arranged for contacting said first side of the bus bar, and a sixth contact arm arranged for contacting said second side of the bus bar opposite said first side, said fifth and sixth contact arms extending said first distance from said edge; and, a fourth clip for slidably receiving said edge of the bus bar, the fourth clip including a seventh contact arm arranged for contacting said first side of the bus bar, and an eighth contact arm arranged for contacting said second side of the bus bar opposite said first side, said seventh and eighth contact arms extending said second distance from said edge;

wherein said first, third, fifth, and seventh contact arms are formed from a first piece of electrically conductive material, a common root portion formed from said first piece of electrically conductive material, said first, third, fifth, and seventh contact arms extending from said common root portion, a first radius formed in said common root portion between said first and third contact arms and in said common root portion between said fifth and seventh contact arms; and a second radius, different than the first radius, formed in said common root portion between said third and fifth contact arms, said first and second radii being selected to provide substantially equal material stress within said electrically conductive material where said first, third, fifth, and seventh contact arms join said common root portion.

2. The staggered clip assembly of claim 1 wherein said second, fourth, sixth, and eighth contact arms are formed from a second piece of electrically conductive material.

3. The staggered clip assembly of claim 1 wherein said first, third, fifth, and seventh contact arms each have a first width where said first, third, fifth, and seventh contact arms join said common root portion, and said first, third, fifth, and seventh contact arms each have a second width at a free end of said first, third, fifth, and seventh contact arms, said first width being greater than said second width.

4. The staggered clip assembly of claim 2 wherein said common root portion is a first common root portion, the staggered clip assembly further including a first base portion formed from said first piece of electrically conductive material, said first base portion extending from said first common root portion; a second common root portion formed from said second piece of electrically conductive material, said second, fourth, sixth, and eighth contact arms extending from said second common root portion; and, a second base portion formed from said second piece of electrically conductive material, said second base portion extending from said second common root portion, said first common root portion being attached to said second common root portion.

5. The staggered clip assembly of claim 2, further including a first tab formed from said first piece of electrically conductive material, said first tab extending from said first common root portion for attaching said first common root portion to said second common root portion.

6. The staggered clip assembly of claim 4, further including a rectangular conducting plate electrically connected to said first and second base portions; a lug electrically connected to said rectangular conducting plate, said lug being formed from a block of electrically conductive material, said lug including a first side having a shoulder formed thereon for contacting an edge of said rectangular conducting plate and aligning said lug with said rectangular conducting plate, a second side having a first hole disposed therein for accepting an electrical wire, and a third side having a second hole disposed therein for accepting a set screw, said set screw for securing said wire within said first hole.

7. The staggered clip assembly of claim 1 wherein the second radius is greater than the first radius.

8. A staggered clip assembly for providing electrical connection to a bus bar, the staggered clip assembly comprising:
a first clip for slidably receiving an edge of the bus bar, the first clip including a first contact arm arranged for contacting a first side of the bus bar, and a second contact arm arranged for contacting a second side of the bus bar opposite said first side, said first and second contact arms extending a first distance from said edge;
a second clip for slidably receiving said edge of the bus bar, the second clip including a third contact arm arranged for contacting said first side of the bus bar, and a fourth contact arm arranged for contacting said second side of the bus bar opposite said first side, said third and fourth contact arms extending a second distance from said edge, said second distance being less than said first distance;
wherein said first and third contact arms are formed from a first piece of electrically conductive material, and said second and fourth contact arms are formed from a second piece of electrically conductive material;
a first common root portion formed from said first piece of electrically conductive material, said first and third contact arms extending from said first common root portion;
a first base portion formed from said first piece of electrically conductive material, said first base portion extending from said first common root portion;
a second common root portion formed from said second piece of electrically conductive material, said second and fourth contact arms extending from said second common root portion;
a second base portion formed from said second piece of electrically conductive material, said second base portion extending from said second common root portion, said first common root portion being attached to said second common root portion;
a rectangular conducting plate electrically connected to said first and second base portions; and,
a lug electrically connected to said rectangular conducting plate, said lug being formed from a block of electrically conductive material, said lug including a first side having a shoulder formed thereon for contacting an edge of said rectangular conducting plate and aligning said lug with said rectangular conducting plate, a second side having a first hole disposed therein for accepting an electrical wire, and a third side having a second hole disposed therein for accepting a set screw, said set screw for securing said wire within said first hole.

9. The staggered clip assembly of claim 8 further including a third clip for slidably receiving said edge of the bus bar, the third clip including a fifth contact arm arranged for contacting said first side of the bus bar, and a sixth contact arm arranged for contacting said second side of the bus bar opposite said first side, said fifth and sixth contact arms extending said first distance from said edge.

10. The staggered clip assembly of claim 9, further including a fourth clip for slidably receiving said edge of the bus bar, the fourth clip including a seventh contact arm arranged for contacting said first side of the bus bar, and an eighth contact arm arranged for contacting said second side of the bus bar opposite said first side, said seventh and eighth contact arms extending said second distance from said edge.

11. The staggered clip assembly of claim 10 wherein said first, third, fifth, and seventh contact arms extend from said first common root portion, a first radius formed in said first common root portion between said fifth and seventh contact arms, and a second radius formed in said first common root portion between said third and fifth contact arms, said first and second radii being selected to provide substantially equal material stress within said first piece of electrically conductive material where said first, third, fifth, and seventh contact arms join said first common root portion.

12. The staggered clip assembly of claim 8 wherein said first and third contact arms each have a first width where said first and third contact arms join said first common root portion, and said first and third contact arms each have a second width at a free end of said first and third contact arms, said first width being greater than said second width.

13. The staggered clip assembly of claim 8 further including a first tab formed from said first piece of electrically conductive material, said first tab extending from said first common root portion for attaching said first common root portion to said second common root portion.

14. A staggered clip assembly for providing electrical connection to a bus bar, the staggered clip assembly comprising:
a first clip for slidably receiving an edge of the bus bar, the first clip including a first contact arm arranged for contacting a first side of the bus bar, and a second contact arm arranged for contacting a second side of the bus bar opposite said first side, said first and second contact arms extending a first distance from said edge;
a second clip for slidably receiving said edge of the bus bar, the second clip including a third contact arm arranged for contacting said first side of the bus bar, and a fourth contact arm arranged for contacting said second side of the bus bar opposite said first side, said third and fourth contact arms extending a second distance from said edge, said second distance being less than said first distance;

a third clip for slidably receiving said edge of the bus bar, the third clip including a fifth contact arm arranged for contacting said first side of the bus bar, and a sixth contact arm arranged for contacting said second side of the bus bar opposite said first side, said fifth and sixth contact arms extending a third distance, said third distance being less than said first distance; and, a fourth clip for slidably receiving said edge of the bus bar, the fourth clip including a seventh contact arm arranged for contacting said first side of the bus bar, and an eighth contact arm arranged for contacting said second side of the bus bar opposite said first side, said seventh and eighth contact arms extending a fourth distance, said fourth distance being greater than said second distance and said third distance;

wherein the second clip is between the first and third clips and the third clip is between the second and fourth clips.

15. The staggered clip assembly of claim 14 wherein said second distance and said third distance are equal.

16. The staggered clip assembly of claim 14 wherein said first distance and said fourth distance are equal.

17. The staggered clip assembly of claim 14 wherein said second distance and said third distance are equal and wherein said first distance and said fourth distance are equal.

* * * * *